United States Patent
Yang

(10) Patent No.: US 12,193,431 B2
(45) Date of Patent: Jan. 14, 2025

(54) TRAP

(71) Applicant: SHENG HAN TOOL CO., LTD., Changhua County (TW)

(72) Inventor: Ming-Chang Yang, Changhua County (TW)

(73) Assignee: SHENG HAN TOOL CO., LTD., Changhua County (TW)

( * ) Notice: Subject to any disclaimer, the term of this patent is extended or adjusted under 35 U.S.C. 154(b) by 126 days.

(21) Appl. No.: 18/080,219

(22) Filed: Dec. 13, 2022

(65) Prior Publication Data
US 2023/0116447 A1 Apr. 13, 2023

Related U.S. Application Data

(63) Continuation-in-part of application No. 17/097,669, filed on Nov. 13, 2020, now abandoned.

(51) Int. Cl.
*A01M 23/30* (2006.01)
*A01M 23/24* (2006.01)

(52) U.S. Cl.
CPC ............ *A01M 23/30* (2013.01); *A01M 23/24* (2013.01)

(58) Field of Classification Search
CPC .... A01M 23/265; A01M 23/30; A01M 23/00; A01M 23/005; A01M 23/08; A01M 23/16; A01M 23/22; A01M 23/24; A01M 23/26; A01M 23/28; A01M 23/18
USPC ............................................................ 43/90
See application file for complete search history.

(56) References Cited

U.S. PATENT DOCUMENTS

| | | | |
|---|---|---|---|
| 240,747 A | 4/1881 | Melson | |
| 1,407,096 A | 2/1922 | Spencer | |
| 1,765,144 A | 6/1930 | Gibbs | |
| 2,068,508 A * | 1/1937 | Orr | A01M 23/30 43/83.5 |
| 2,222,653 A | 11/1940 | Chambless et al. | |
| 2,420,371 A * | 5/1947 | Hampton | A01M 23/30 43/83 |
| 2,637,931 A | 5/1953 | Sklar | |
| 4,665,644 A * | 5/1987 | Vajs | A01M 23/30 43/82 |
| 5,172,512 A | 12/1992 | Bodker et al. | |
| 5,337,512 A | 8/1994 | Krenzler | |
| 6,508,031 B1 * | 1/2003 | Johnson | A01M 23/30 43/88 |
| 7,757,429 B1 | 7/2010 | Cambio | |
| D678,977 S | 3/2013 | Huang | |
| D722,127 S | 2/2015 | Huang | |
| 9,210,924 B1 | 12/2015 | Terrell | |
| 9,258,990 B1 * | 2/2016 | Harvey | A01M 23/245 |
| D896,338 S | 9/2020 | Hetman | |
| 2007/0277426 A1 | 12/2007 | Wolfgram | |
| 2009/0151223 A1 | 6/2009 | Nathan et al. | |

(Continued)

FOREIGN PATENT DOCUMENTS

EP 1300077 A2 4/2003
GB 2565808 A 2/2019

*Primary Examiner* — Darren W Ark
*Assistant Examiner* — Katelyn T Truong
(74) *Attorney, Agent, or Firm* — MUNCY, GEISSLER, OLDS & LOWE, P.C.

(57) ABSTRACT

A trap is provided, including: a clamping device, being operable to provide a catching space; and a shielding member, movably connected to the clamping device, the shielding member being movable to shield at least part of the catching space.

15 Claims, 8 Drawing Sheets

(56) References Cited

U.S. PATENT DOCUMENTS

| | | |
|---|---|---|
| 2009/0249680 A1 | 10/2009 | Watson et al. |
| 2010/0257773 A1 | 10/2010 | O |
| 2011/0072708 A1 | 3/2011 | Nathan et al. |
| 2011/0126446 A1* | 6/2011 | Huang .................. A01M 23/26 43/88 |
| 2012/0011764 A1* | 1/2012 | Dobias .................. A01M 23/30 43/88 |
| 2012/0174469 A1 | 7/2012 | Gardner et al. |
| 2017/0156308 A1 | 6/2017 | Frisch et al. |
| 2018/0249698 A1* | 9/2018 | Jensen ................... G08B 21/18 |
| 2019/0327955 A1 | 10/2019 | Walsh et al. |
| 2020/0390082 A1 | 12/2020 | Waiker et al. |
| 2021/0092946 A1 | 4/2021 | Blair et al. |

\* cited by examiner

TRAP

The present invention is a CIP of application Ser. No. 17/097,669, filed Nov. 13, 2020, the entire contents of which are hereby incorporated by reference.

BACKGROUND OF THE INVENTION

Field of the Invention

Description of the Prior Art

Generally, animals can move quickly. Therefore, people would set up traps on the ground to capture animals. The trap can trap the animal easily because it is well concealed and the animal is uneasy to be aware of the trap. As a result, the trap is a commonly used device.

However, although the trap can clamp and trap the body of the animal, the conventional trap on the market only focus on the lethality and bite force but ignores the safety. Therefore, it often causes harms to the person(s) during operation, or accidentally hurts pets or others.

The present invention is, therefore, arisen to obviate or at least mitigate the above-mentioned disadvantages.

SUMMARY OF THE INVENTION

The main object of the present invention is to provide a trap which can prevent unintentional triggering.

To achieve the above and other objects, a trap is provided, including: a clamping device, being operable to provide a catching space; and a shielding member, movably connected to the clamping device, the shielding member being movable to shield at least part of the catching space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
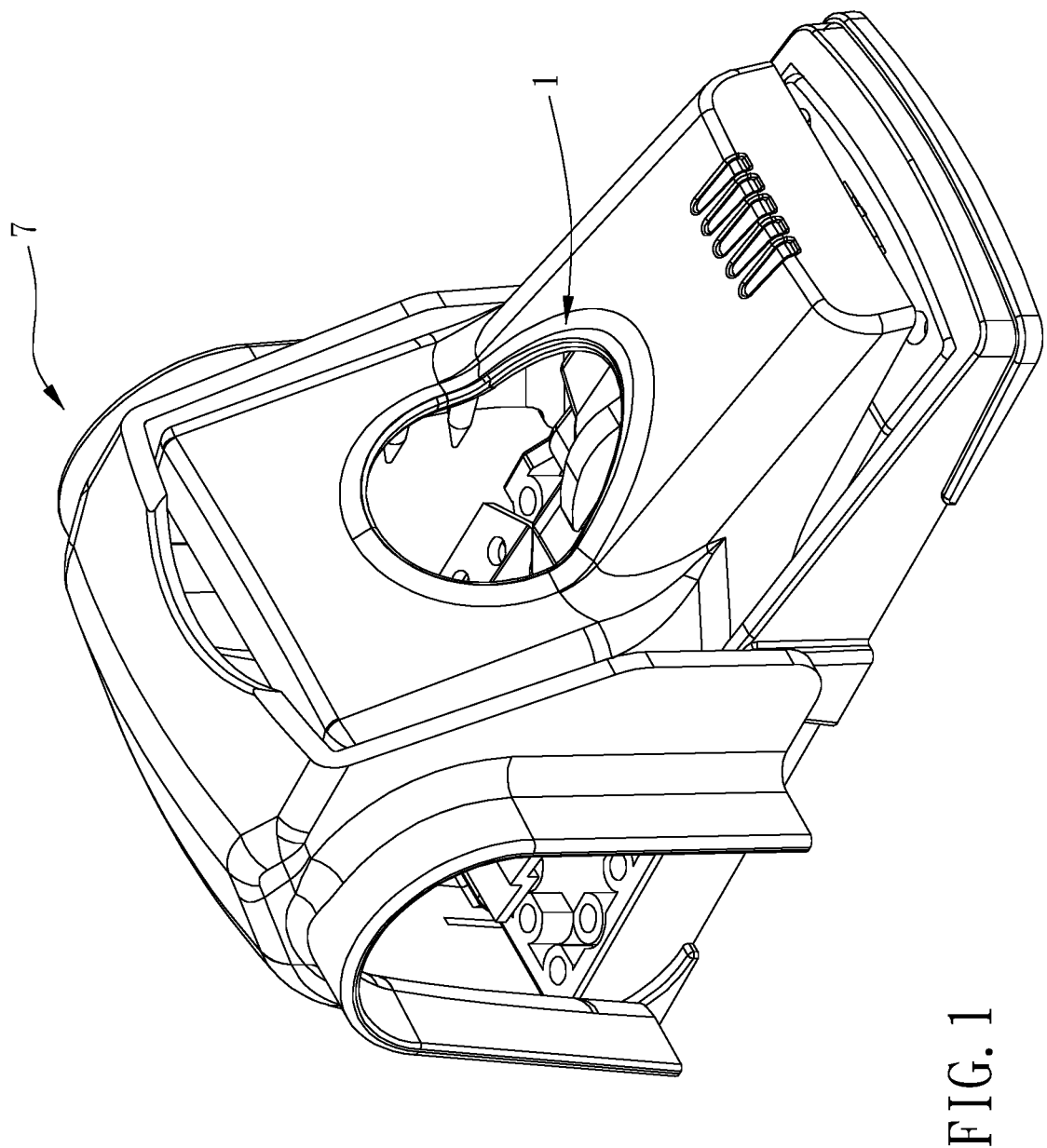
FIG. 1 is a stereogram of a preferable embodiment of the present invention.
Figure 2:
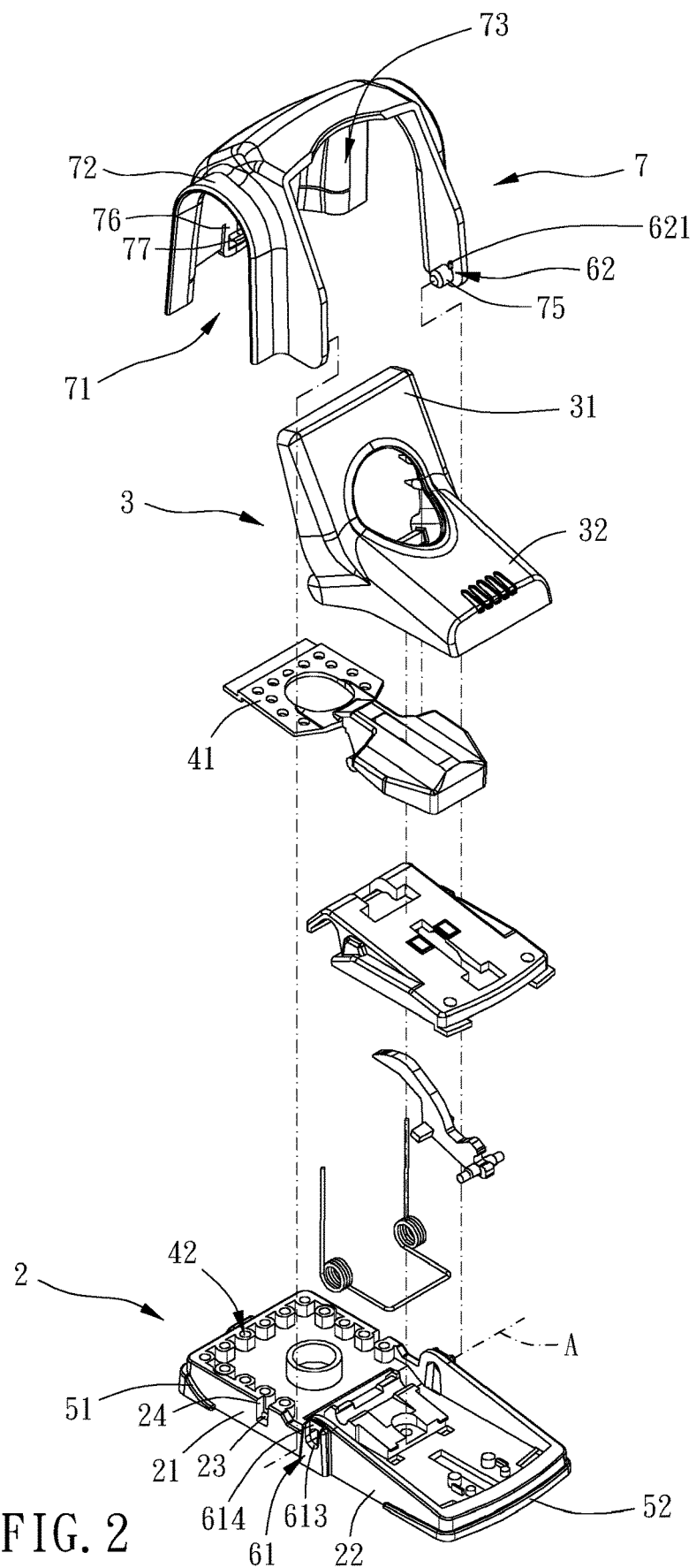
FIG. 2 is a breakdown drawing of a preferable embodiment of the present invention.
Figure 3:
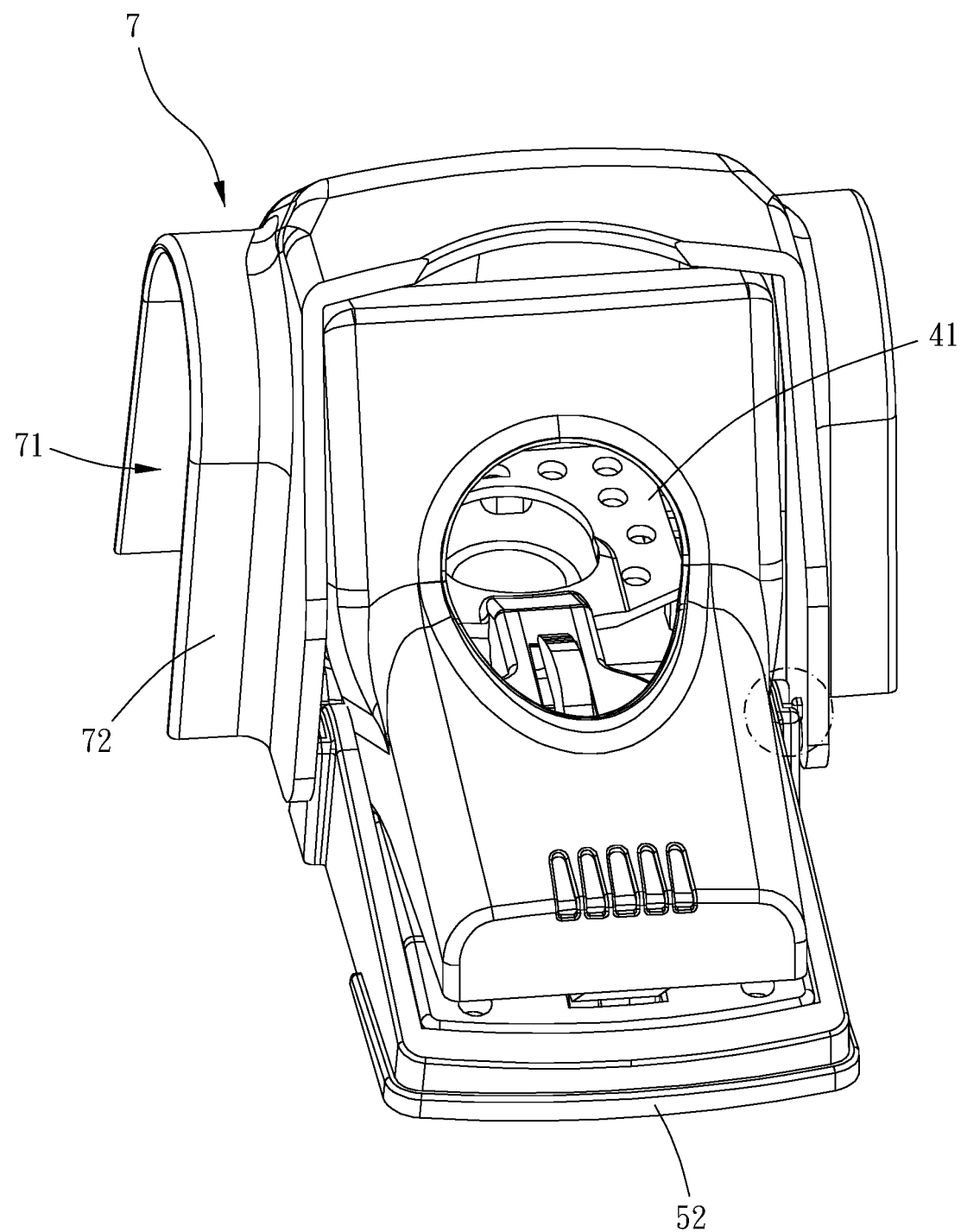
FIG. 3 is another stereogram of a preferable embodiment of the present invention.
Figure 4:
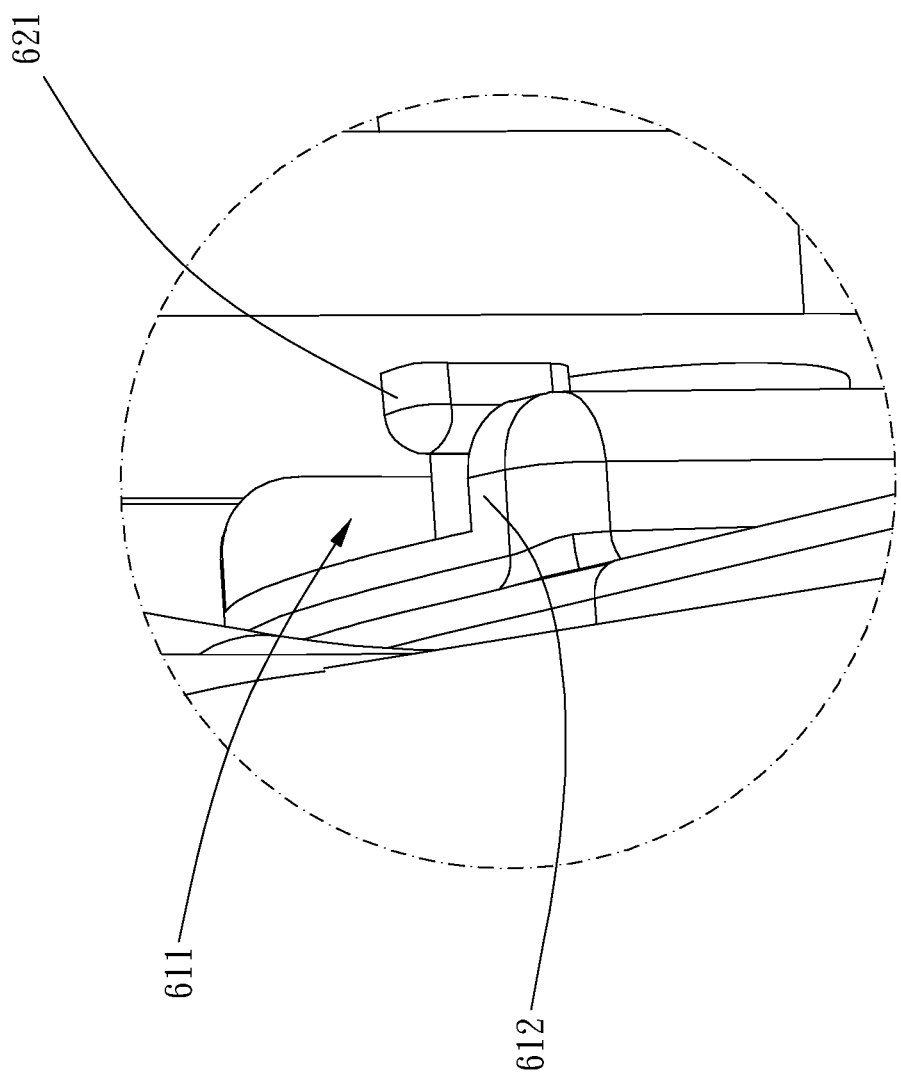
FIG. 4 is a partial enlargement of FIG. 3.

Please refer to FIGS. 1 to 7 for a preferable embodiment of the present invention. A trap 1 of the present invention includes a clamping device 1 and a shielding member 7.

The clamping device 1 is operable to provide a catching space 11, wherein the catching space 11 is configured to trap an animal such as a rat, and bait can be disposed in the catching space 11 for baiting the rat. The shielding member 7 is movably connected to the clamping device 1, and the shielding member 7 is movable to shield at least part of the catching space 11. Whereby, the shielding member 7 can block external ones such as pets, babies or children from reaching the clamping device 1, thus avoiding danger.

Specifically, the shielding member 7 includes at least one entrance hole 71 disposed therethrough and in communication with the catching space 11, and the at least one entrance hole 71 is configured for an animal to reach into the catching space 11. The at least one entrance hole 71 is preferably sized according to the size of target animals, which can providing function for selecting animals to be trapped.

Specifically, the shielding member 7 further includes at least one flange 72 defining the at least one entrance hole 71, and the at least one flange 72 protrudes outwardly in a direction away from the catching space 11. The at least one flange 72 can prevent unexpected part of the animal reaches into the catching space 11 to trigger the clamping device 1. For example, the at least one flange 72 can effectively prevent cats and dogs from reaching into the catching space 11 and accidentally hurting their noses because of curiosity.

In this embodiment, the at least one entrance hole includes three entrance holes 71, and each of the three entrance holes 71 is disposed through the shielding member 7 in a first direction and opening at an end of the shielding member 7 in a second direction lateral to the first direction. When the clamping device 1 is disposed on the ground, each said entrance hole 71 can guide the animal to move toward the catching space 11.

Figure 8:
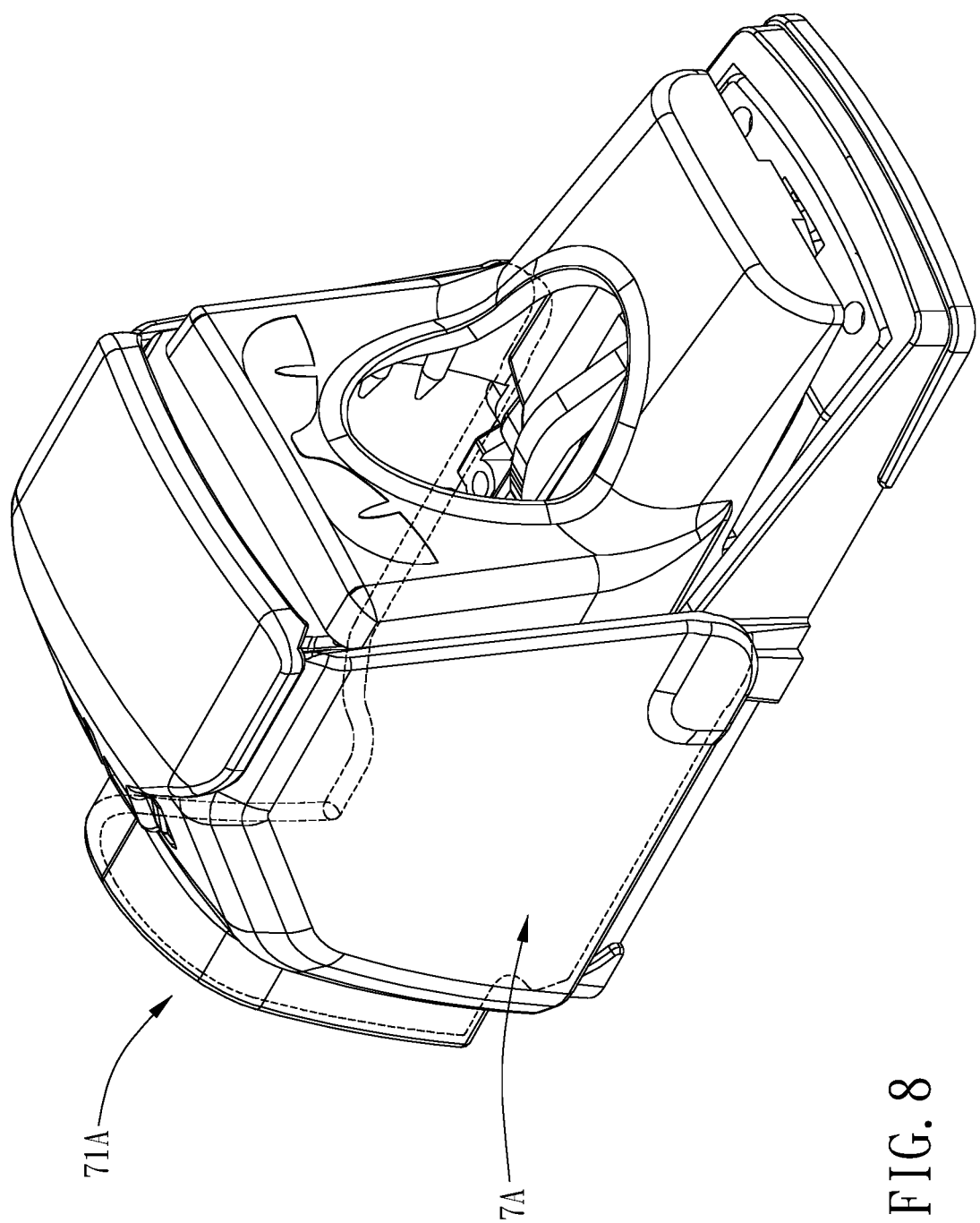
FIG. 8 is a stereogram of another preferable embodiment of the present invention.

In an alternative embodiment (as shown in FIG. 8), a shielding member 7A includes only one entrance hole 71A, which can effectively reduce unexpected triggering of the clamping device 1.

Please refer to FIGS. 1 to 7, the shielding member 7 is swingably connected to the clamping device 1, which is easy to operate. Preferably, the shielding member 7 is detachably connected to the clamping device 1, which is easy to use, repair and/or replace.

Preferably, the clamping device 1 further includes a first blocking portion 51 and a second blocking portion 52 arranged on two opposite sides of a base 2 of the clamping device 1, and the shielding member 7 is swingable between and blockable by the first blocking portion 51 and the second blocking portion 52, which can prevent the shielding member 7 from being damaged due to overswinging.

Preferably, the clamping device 1 further includes at least one first positioning portion 61, the shielding member 7 further includes at least one second positioning portion 62. When the shielding member 7 is located in a shielding position and shields the at least part of the catching space 11, the at least one second positioning portion 62 and the at least one first positioning portion 61 are positioningly engaged with each other so that the shielding member 7 can stably remain in the shielding position even an external force is exerted onto the shielding member 7.

In this embodiment, the at least one first positioning portion 61 includes a recess 611 and a wall portion 612 defining the recess 611, and the at least one second positioning portion 62 includes a protruding portion 621. When the shielding member 7 is located in the shielding position, the protruding portion 621 is engaged within the recess 611, and a part of the wall portion 612 is blockable by the protruding portion 621 on a moving path of the shielding member 7.

The clamping device 1 includes a catching side 12 and an operation side 13, and the catching space 11 is provided at the catching side 12. The clamping device 1 further includes a base 2 and a clamping member 3. The at least one first positioning portion 61, the first blocking portion 51 and the second blocking portion 52 are disposed on the base 2. The base 2 includes a first clamping side 21 and a first positioning side 22. The clamping member 3 is disposed on the base 2 and swingable between an open position and a close position. The clamping member 3 includes a second clamping side 31 and a second positioning side 32. When the clamping member 3 is located in the open position, the second positioning side 32 is releasably positioned to the first positioning side 22, and the second clamping side 31 and the first clamping side 21 define the catching space 11. The clamping device 1 further includes a trigger portion 41, and the trigger portion 41 is received within the catching space 11 and movable with the clamping member 3. The shielding member 7 is pivoted to the base 2 and entirely rotatable between the catching side 12 and the operation side 13. When the shielding member 7 is located at the catching side 12, as viewed in a axial direction A which the shielding member 7 is rotatable about, a side of the trigger portion 41 facing away from the base 2 is entirely shielded by and under the shielding member 7 and the clamping device 1, and the operation side 13 is at least partially exposed out of the shielding member 7, which is convenient to operate and effectively avoids unintentional triggering of the clamping device 1.

Figure 5:
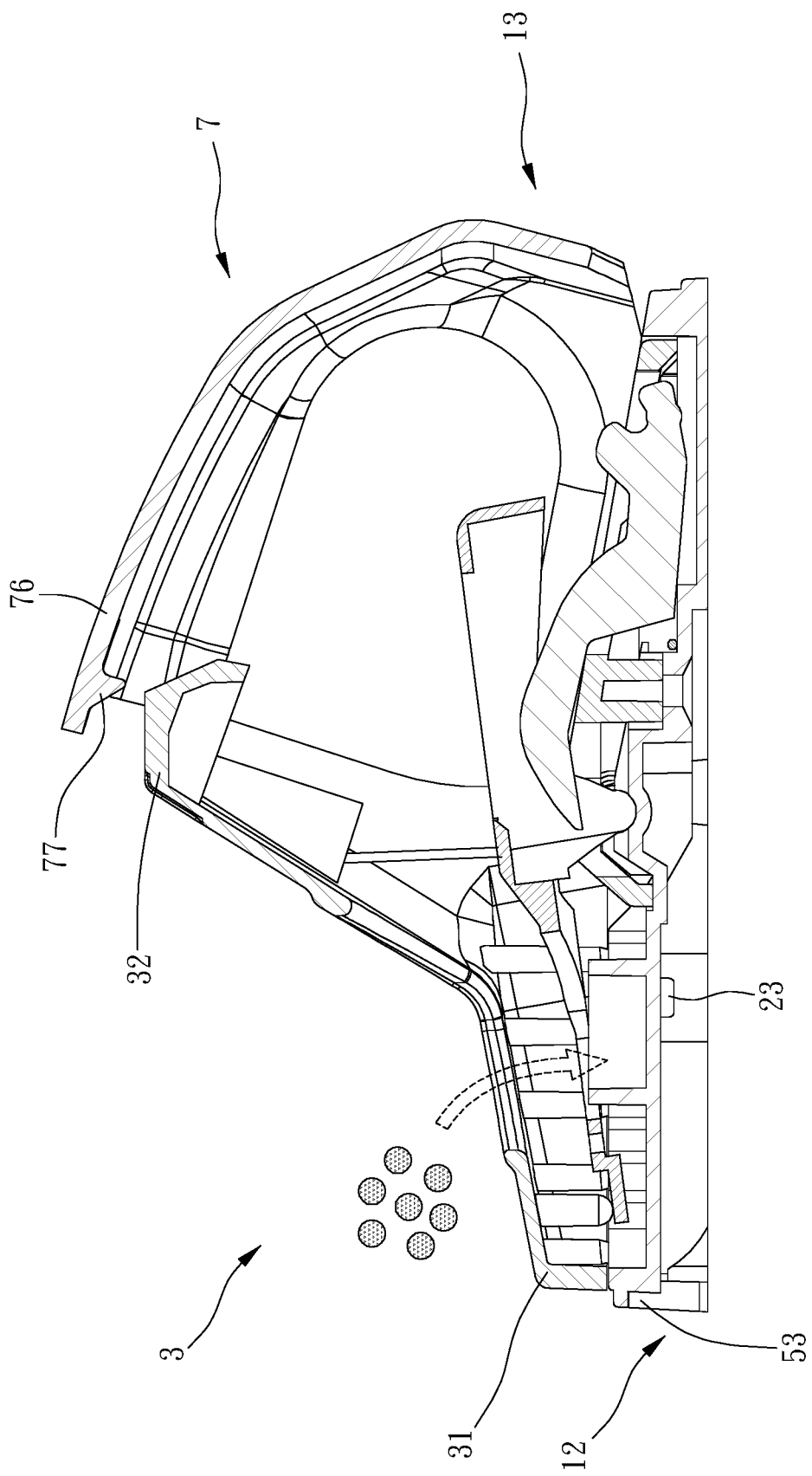
FIGS. 5 to 7 are cross-sectional views showing operation of a preferable embodiment of the present invention.

When the shielding member 7 is moved away from the catching side 12 and located at the operation side 13, the catching side 12 is at least partially exposed out of the shielding member 7, as shown in FIG. 5, which is convenient to put the bait on the base 2.

The bait is disposed under the trigger portion 41 so that the animal can be baited to press the trigger portion 41 to actuate the biting of the clamping member 3. In this embodiment, the three entrance holes 71 are equiangularly arranged relative to the trigger portion 41, which provides plural ways of reaching into the catching space 11. When the trigger portion 41 is pressed to trigger the clamping member 3 to move toward the close position, the second positioning side 32 is disengaged from the first positioning side 22, and the second clamping side 31 closes toward the first clamping side 21 so as to trap the animal quickly.

Preferably, the second clamping side 31 includes a plurality of tooth members 43, for catching the animal firmly. The first clamping side 21 includes a plurality of receiving holes 42, and the plurality of receiving holes 42 correspond to the plurality of tooth members 43, respectively. Each of the plurality of tooth members can insert into one of the plurality of receiving holes 42, which avoids damages to the plurality of tooth members 43.

Figure 6:
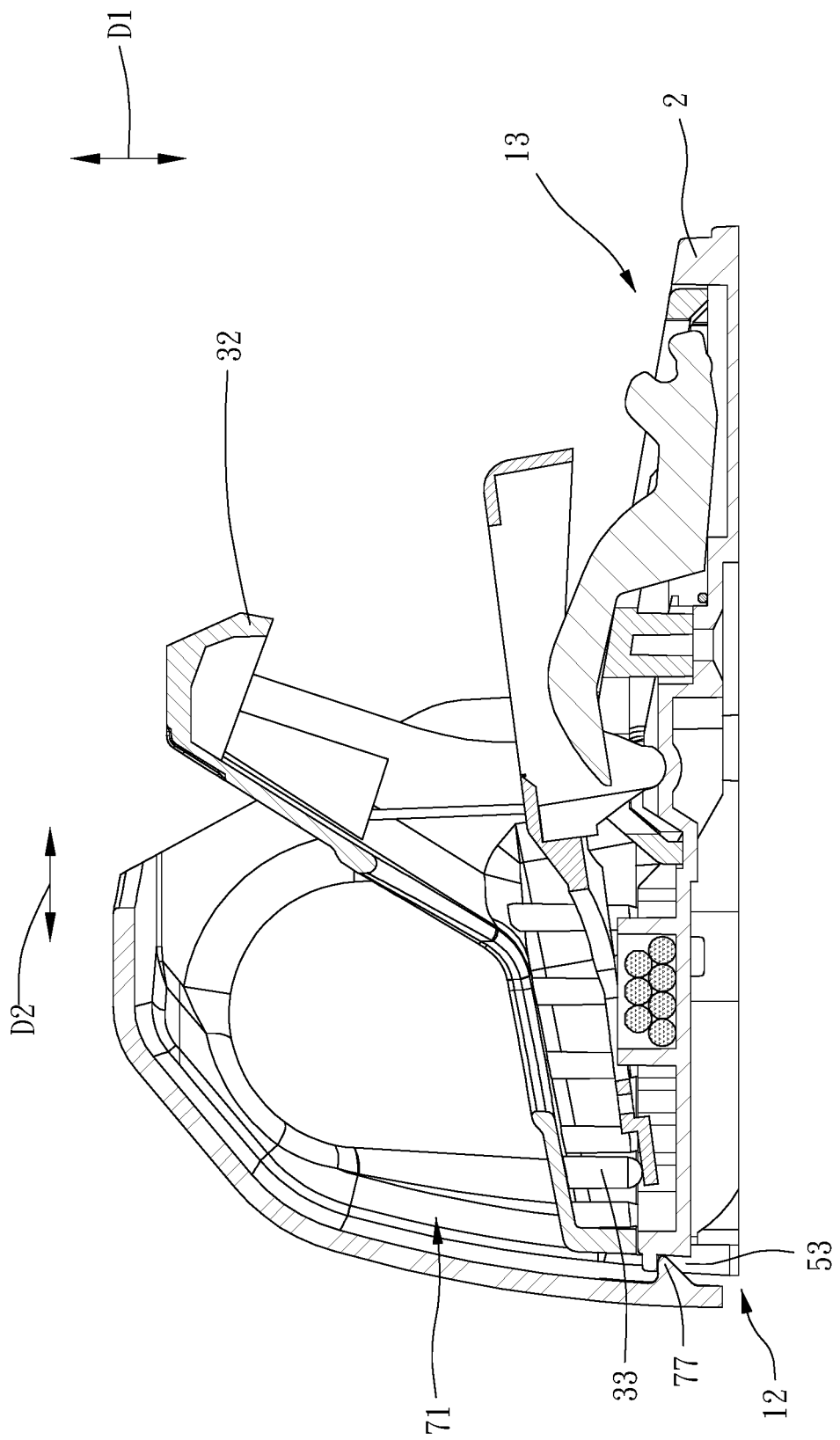
Figure 7:
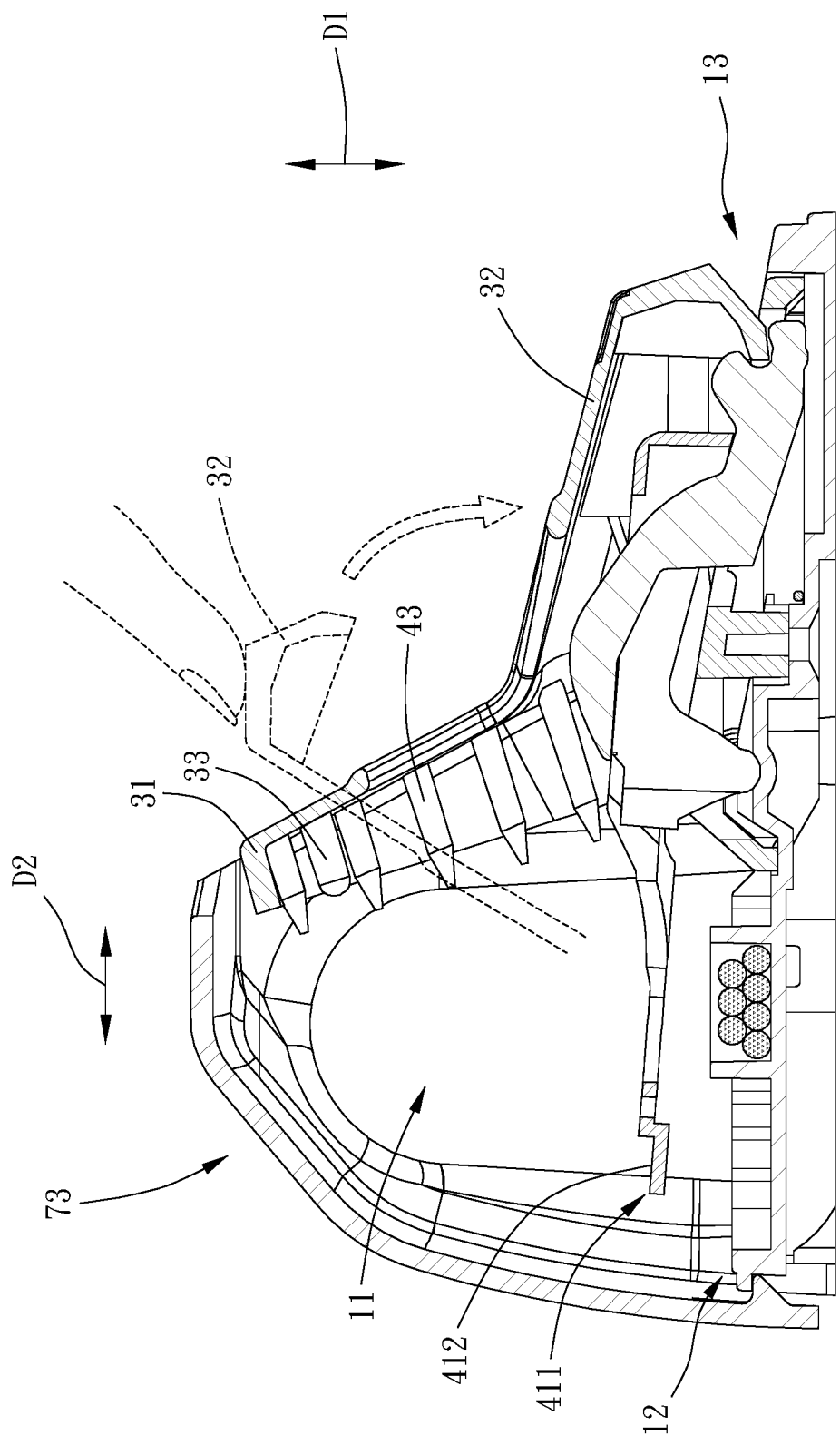

It is noted that the shielding member 7 further includes an operation opening 73, and the operation opening 73 is disposed through the shielding member 7 in a first direction D1 and opens at an end of the shielding member 7 near the operation side 13 in a second direction D2 transverse to the first direction D1. When the shielding member 7 shields the at least part of the catching space 11 and the clamping member 3 is in the close position, the second positioning side 32 is located between the base 2 and the operation opening 73 and corresponds to the operation opening 73 in the first direction D1, as shown in FIG. 6.

Specifically, in operation, the clamping member 3 is located in the close position (the catching space 11 is closed), the bait is disposed under the trigger portion 41, the shielding member 7 is swung to shield the second clamping side 31 where the second positioning side 32 is located correspondingly under the operation opening 73 so that the finger of a user can move through the operation opening 73 to move the second positioning side 32 toward the first positioning side 22 so as to set the clamping member 3 in the open position (the catching space 11 is open). During operation, the finger of the user keeps outside the catching space 11, and thus it can effectively avoid injury to the user.

Specifically, the shielding member 7 is integrally formed of one piece, and the shielding member 7 has a fixed configuration; the base 2 further includes at least one pivot hole 613 which is disposed axially through a lateral wall thereof and at least one groove 614 which is radially in communication with the at least one pivot hole 613, and the shielding member 7 further includes at least one pin member 75 rotatably inserted in the at least one pivot hole 613; the base 2 further includes an engaging recess 53 at the catching side 12, the shielding member 7 includes an elastic arm 76 having a hook 77, and when the shielding member 7 is located at the catching side 12, the hook 77 is releasably hooked in the engaging recess 53; the clamping member 3 further includes at least one post 33, the trigger portion 41 includes a distal end portion 411 including a recession 412 adjacent to the catching side 12, and when the shielding member 7 is located at the catching side 12, the at least one post 33 is abutted against the distal end portion 411 and projects within the recession 412; the base 2 further includes two through holes 23 which are disposed respectively on opposing sides at the first clamping side 21 and two slots 24 which are in communication with the two through holes 23, respectively, which allows the using of at least one fixation, positioning, securing or tying means, such nail, wire, cable tie or the like, to hold or restrict the trap.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A trap, including:
   a clamping device, including a catching side and an operation side, being operable to provide a catching space at the catching side; and
   a shielding member, movably connected to the clamping device, the shielding member being movable to shield at least part of the catching space;
   wherein the clamping device further includes a base and a clamping member, the base includes a first clamping side and a first positioning side, the clamping member is disposed on the base and swingable between an open position and a close position, the clamping member further includes a second clamping side and a second positioning side, when the clamping member is located in the open position, the second positioning side is releasably positioned to the first positioning side, and the second clamping side and the first clamping side define the catching space, when the clamping member moves toward the close position, the second positioning side is disengaged from the first positioning side, and the second clamping side closes toward the first clamping side;
   wherein the clamping device further includes a trigger portion, the trigger portion is received within the catching space and movable with the clamping member;
   wherein the clamping member, the trigger portion and the shielding member are rotatably connected to a middle portion of the base, and the shielding member is entirely rotatable between the catching side and the operation side; when the shielding member is located at the catching side, as viewed in an axial direction which the shielding member is rotatable about, a side of the trigger portion facing away from the base is covered by and under the shielding member as viewed in a top-down orientation, and the operation side is at least partially exposed out of the shielding member; when the shielding member is moved away from the catching side and located at the operation side, the catching side is at least partially exposed out of the shielding member;

wherein the first clamping side includes a plurality of receiving holes, the second clamping side includes a plurality of tooth members having different lengths, the different lengths of the plurality of tooth members increase in a direction from the second clamping side toward the second positioning side, and the plurality of receiving holes correspond to the plurality of tooth members, respectively;

wherein when the shielding member is located at the operation side and the plurality of tooth members are received in the plurality of receiving holes, a distal end of the second positioning side is covered by and under the shielding member as viewed in the top-down orientation;

wherein when the shielding member is located at the catching side and the plurality of tooth members are received in the plurality of receiving holes, the distal end of the second positioning side is exposed out of the shielding member as viewed in the top-down orientation and capable of being pressed downwards;

wherein when the shielding member is located at the catching side and the second positioning side is positioned to the first positioning side, a distal end of the second clamping side is covered by and under the shielding member as viewed in the top-down orientation.

2. The trap of claim 1, wherein the shielding member includes at least one entrance hole disposed therethrough and in communication with the catching space, and the at least one entrance hole is configured for an animal to reach into the catching space.

3. The trap of claim 2, wherein the shielding member further includes at least one flange defining the at least one entrance hole, and the at least one flange protrudes outwardly in a direction away from the catching space.

4. The trap of claim 1, wherein the shielding member further includes an operation opening, and when the shielding member shields the at least part of the catching space and the clamping member is in the close position, the second positioning side is located between the base and the operation opening and corresponds to the operation opening.

5. The trap of claim 1, wherein the shielding member is swingably connected to the clamping device.

6. The trap of claim 5, wherein the clamping device further includes a first blocking portion and a second blocking portion arranged on two opposite sides of the base, and the shielding member is swingable between the first blocking portion and the second blocking portion.

7. The trap of claim 1, wherein the clamping device further includes at least one first positioning portion, the shielding member further includes at least one second positioning portion, and when the shielding member is located in a shielding position and shields the at least part of the catching space, the at least one second positioning portion and the at least one first positioning portion are positioningly engaged with each other.

8. The trap of claim 7, wherein the at least one first positioning portion includes a recess and a wall portion defining the recess, the at least one second positioning portion includes a protruding portion, and when the shielding member is located in the shielding position, the protruding portion is engaged within the recess, and a part of the wall portion is blockable by the protruding portion on a moving path of the shielding member.

9. The trap of claim 4, wherein the shielding member includes at least one entrance hole disposed therethrough and in communication with the catching space, the at least one entrance hole is configured for an animal to reach into the catching space; the shielding member further includes at least one flange defining the at least one entrance hole, the at least one flange protrudes outwardly in a direction away from the catching space; the shielding member is swingably connected to the clamping device; the clamping device further includes a first blocking portion and a second blocking portion arranged on two opposite sides of the base, and the shielding member is swingable between the first blocking portion and the second blocking portion; the clamping device further includes at least one first positioning portion, the shielding member further includes at least one second positioning portion, when the shielding member is located in a shielding position and shields the at least part of the catching space, the at least one second positioning portion and the at least one first positioning portion are positioningly engaged with each other; the at least one first positioning portion includes a recess and a wall portion defining the recess, the at least one second positioning portion includes a protruding portion, when the shielding member is located in the shielding position, the protruding portion is engaged within the recess, a part of the wall portion is blockable by the protruding portion on a moving path of the shielding member; the at least one entrance hole includes three entrance holes; the three entrance holes are equiangularly arranged relative to the trigger portion; and the shielding member is detachably connected to the clamping device.

10. The trap of claim 1, wherein the base further includes at least one pivot hole which is disposed axially through a lateral wall thereof and at least one groove which is radially in communication with the at least one pivot hole, and the shielding member further includes at least one pin member rotatably inserted in the at least one pivot hole.

11. The trap of claim 1, wherein the base further includes an engaging recess at the catching side, the shielding member includes an elastic arm having a hook, and when the shielding member is located at the catching side, the hook is releasably hooked in the engaging recess.

12. The trap of claim 1, wherein the clamping member further includes at least one post, the trigger portion includes a distal end portion including a recession adjacent to the catching side, and the at least one post is capable of abutting against the distal end portion.

13. The trap of claim 1, wherein the shielding member is integrally formed of one piece.

14. The trap of claim 1, wherein the base further includes two through holes disposed respectively on opposing sides at the first clamping side.

15. The trap of claim 14, wherein the base further includes two slots in communication with the two through holes, respectively.

* * * * *